United States Patent
Nakamura

(10) Patent No.: US 10,845,643 B2
(45) Date of Patent: Nov. 24, 2020

(54) IMAGE FORMING APPARATUS

(71) Applicant: SHARP KABUSHIKI KAISHA, Osaka (JP)

(72) Inventor: Yasushi Nakamura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/601,890

(22) Filed: Oct. 15, 2019

(65) Prior Publication Data
US 2020/0124916 A1 Apr. 23, 2020

(30) Foreign Application Priority Data

Oct. 17, 2018 (JP) .................................. 2018-195503

(51) Int. Cl.
| | |
|---|---|
| G09F 13/18 | (2006.01) |
| G02F 1/13357 | (2006.01) |
| H04N 1/00 | (2006.01) |
| F21V 8/00 | (2006.01) |

(52) U.S. Cl.
CPC ..... *G02F 1/133603* (2013.01); *G02B 6/0063* (2013.01); *H04N 1/00129* (2013.01); *H04N 1/00411* (2013.01)

(58) Field of Classification Search
CPC ............ H04N 1/00129; H04N 1/00411; G02F 1/133603; G02B 6/0063
See application file for complete search history.

(56) References Cited

U.S. PATENT DOCUMENTS

| | | | | |
|---|---|---|---|---|
| 6,741,301 B2 * | 5/2004 | Tsuji | .................... | G02B 6/0055 345/1.1 |
| 6,795,662 B2 * | 9/2004 | Kudo | ................. | G03G 15/5016 399/107 |
| 7,478,938 B2 * | 1/2009 | Watanabe | .............. | G02B 6/005 362/607 |
| 7,671,940 B2 * | 3/2010 | Li | ........................ | G02B 6/0063 349/114 |
| 8,373,867 B2 * | 2/2013 | Nakai | ................ | H04N 1/00347 358/1.1 |
| 8,750,740 B2 * | 6/2014 | Potter | ................ | H04N 1/00493 399/81 |
| 10,005,301 B2 * | 6/2018 | Yamamoto | ............... | B41J 29/02 |

FOREIGN PATENT DOCUMENTS

JP 2002-374380 A 12/2002

* cited by examiner

*Primary Examiner* — Matthew J. Peerce
(74) *Attorney, Agent, or Firm* — ScienBiziP, P.C.

(57) ABSTRACT

An image forming apparatus includes a status display part. The status display part is provided on a rear side of a touch panel display within the range including the lateral width of an operation unit. The status display part includes LEDs as a light source and a light emitter that transmits light from the LEDs to emit the light to the outside. A filter includes a first surface and a second surface that have different angles in an up-down direction.

5 Claims, 9 Drawing Sheets

FIG. 8
LIGHT EMISSION PATTERN 1
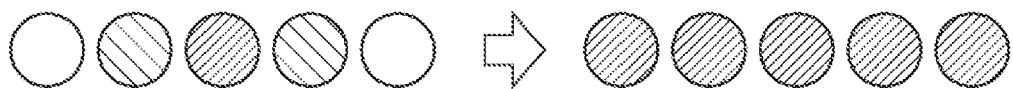
LIGHT EMISSION PATTERN 2
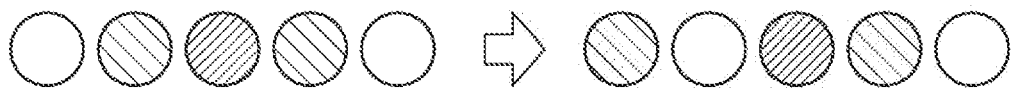
LIGHT EMISSION PATTERN 3
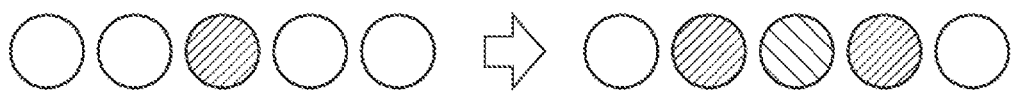
LIGHT EMISSION PATTERN 4
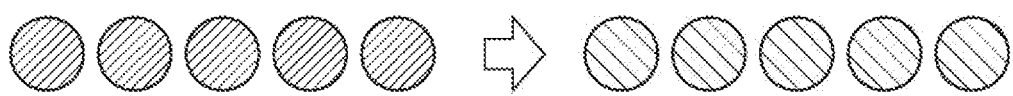
LIGHT EMISSION PATTERN 5
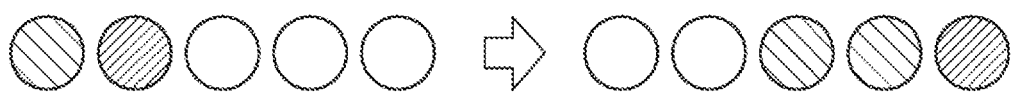
 ⋯ OFF
 ⋯ ON (INTENSITY: LOW)
 ⋯ ON (INTENSITY: HIGH)

IMAGE FORMING APPARATUS

BACKGROUND OF THE INVENTION

Field of the Invention

The present invention relates to an image forming apparatus, and more particularly to an image forming apparatus including a status display part for notifying a user of the status of the apparatus.

Description of the Background Art

An example of an image forming apparatus of the background art is disclosed in Japanese Unexamined Patent Application Publication No. 2002-374380. In the image forming apparatus described in Japanese Unexamined Patent Application Publication No. 2002-374380, an energy saving transition key is provided to an operating part, and a light emitting diode is provided adjacent to the energy saving transition key and is turned on or blinks according to the state of the image forming apparatus.

In conventional image forming apparatuses, a light emitting diode is provided on the upper surface of an operating part, so that it is easy for persons operating the image forming apparatuses to visually recognize the light emitting diodes; however, it is difficult for persons at places distant from the image forming apparatuses to visually recognize the light emitting diodes, and thus, there is a lot of room left for improvement.

Therefore, the present invention has a main object to provide a novel image forming apparatus.

Another object of the present invention is to provide an image forming apparatus in which the visibility of a status display part for notifying a user of the status of the apparatus can be improved.

SUMMARY OF THE INVENTION

The first aspect of the present invention is an image forming apparatus including an operation unit provided on a front surface side of the image forming apparatus and including at least a touch panel display, and the apparatus includes a status display part provided on a rear side of the touch panel display. The status display part includes a light source and a light emitter that emits light from the light source to the outside. The light emitter includes a first surface and a second surface that emit light from the light source in different visible directions in an up-down direction.

The second aspect of the present invention is an image forming apparatus dependent from the first aspect of the present invention. According to the second aspect of the present invention, it is preferable that the image forming apparatus should further include an image reader. It is preferable that the status display part should be provided on a front surface side of a housing of the image reader.

The third aspect of the present invention is an image forming apparatus dependent from the first aspect of the present invention. According to the third aspect of the present invention, it is preferable that the status display part should be provided to face the touch panel display.

The fourth aspect of the present invention is an image forming apparatus dependent from the first aspect of the present invention. According to the fourth aspect of the present invention, it is preferable that the light emitter should include a light diffusing member that diffuses the light from the light source, and a filter that transmits the light from the light diffusing member and emits the light to the outside. It is preferable that the light diffusing member should be disposed closer to the filter than to a midpoint between the light source and the filter in a light guide path from the light source to the filter.

The fifth aspect of the present invention is an image forming apparatus dependent from the fourth aspect of the present invention. According to the fifth aspect of the present invention, it is preferable that the image forming apparatus should further include a light guide path forming member that forms the light guide path. It is preferable that the light guide path forming member should have a shape that the light guide path becomes larger in lateral width as the light guide path gets closer to the light diffusing member from the light source.

The sixth aspect of the present invention is an image forming apparatus dependent from the first aspect of the present invention. According to the sixth aspect of the present invention, it is preferable that the first surface should be inclined more rearward as it goes downward. It is preferable that the second surface should be inclined more rearward as it goes upward.

The seventh aspect of the present invention is the image forming apparatus dependent from the sixth aspect of the present invention. According to the seventh aspect of the present invention, it is preferable that the first surface should have an area larger than the second surface.

According to the present invention, it is possible to improve the visibility of the status display part for notifying a user of the status of the apparatus.

The above object, other objects, features and advantages of the present invention will become more apparent from the following detailed description of the embodiments with reference to the drawings.

BRIEF DESCRIPTION OF THE DRAWINGS

FIG. 8 is an illustrative view showing examples of light emission patterns of the status display part.

DESCRIPTION OF THE PREFERRED EMBODIMENTS

First Embodiment

Figure 1:
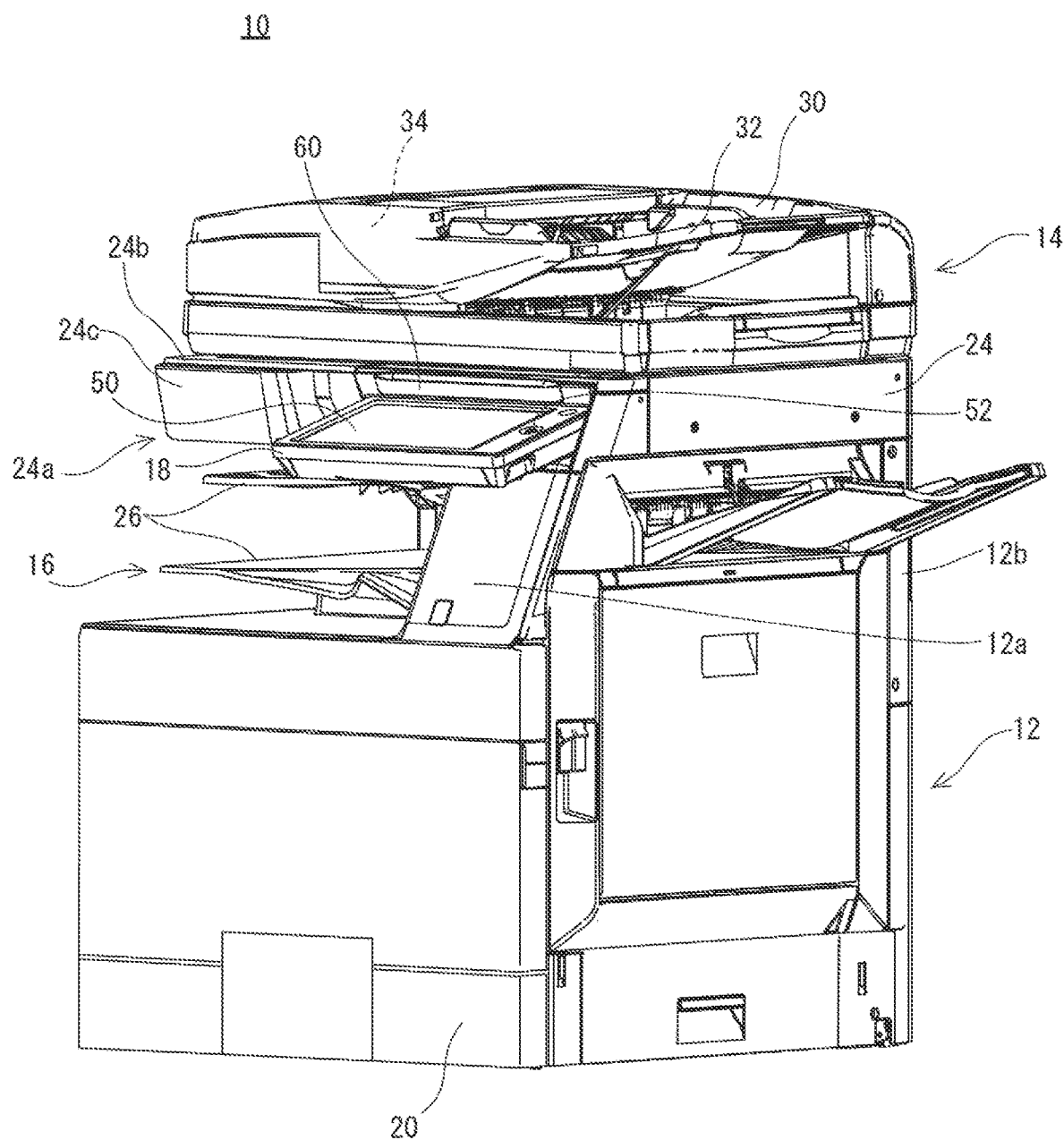
FIG. 1 is a perspective view showing the appearance of an image forming apparatus according to the first embodiment of the present invention.

Referring to FIG. 1, an image forming apparatus 10 according to the first embodiment of the present invention is an image forming apparatus of an in-body sheet discharge type including an in-body sheet discharger 16 between an image forming part 12 and an image reader 14, and the image forming apparatus 10 includes an operation unit 18 provided as a separate unit on the front surface side of the image reader 14. As described later, the image forming apparatus 10 forms multi-color or single-color images on given sheets (recording media) based on image data read by the image reader 14 or the like, and discharges the image-formed sheets to the in-body sheet discharger 16. In the first embodiment, the image forming apparatus 10 is a multi-function peripheral (MFP) having a copying function, a printer function, a scanner function, a facsimile function, and the like.

In the present invention, the surface facing the user's standing position, that is, the surface on which the operation unit 18 is provided is defined as the front (front) to define the front-rear direction (depth direction) of the image forming apparatus 10 and its constituent members. The right-left direction (lateral direction) of the image forming apparatus 10 and its constituent members is defined based on the state of the image forming apparatus 10 when viewed from a user.

First, a description of the basic configuration of the image forming apparatus 10 will be provided. As shown in FIG. 1, the image forming apparatus 10 includes the image forming part 12 and the image reader 14 provided above the image forming part 12.

The housing of the image forming part 12 includes a first connection housing 12a formed on the upper right side and a second connection housing 12b formed on the upper rear side, and the first connection housing 12a and the second connection housing 12b supports the image reader 14. Thus, the in-body sheet discharger 16 that is internal space for storing sheets on which images have been formed is formed on the lower surface side of the image reader 14. The housing 24 of the image reader 14 has a front surface 24c disposed rearward of the front surface of the image forming part 12, and the front surface of the first connection housing 12a defines an upwardly inclined surface of which the lower end projects forward of the upper end.

The image forming part 12 includes an exposure unit, a developing device, a photosensitive drum, a charger, an intermediate transfer belt, a transfer roller, a fixing unit, and the like. The image forming part 12 forms images on sheets conveyed from a paper cassette 20 or the like disposed under the image forming part 12 in an electrophotographic method. To be specific, the image forming part 12 forms electrostatic latent images corresponding to the image data on the photosensitive drum using the charger, the exposure unit, and the like, and visualizes the electrostatic latent images on the photosensitive drum with toner using the developing device. In addition, the toner images formed on the photosensitive drum are transferred to sheets by the intermediate transfer belt, the transfer roller, and the like, and the toner images transferred to the sheets are thermally fixed by the fixing unit. Then, the image-formed sheets are discharged to the in-body sheet discharger 16 from a sheet discharge port (not shown) provided to the first connection housing 12a. Note that the image data for forming images on sheets is image data read by the image reader 14 or image data transmitted from an external computer.

The image forming part 12 has a color printing function, and includes four photoconductor drums, four chargers, four developing devices, four intermediate transfer belts, four transfer rollers, four cleaning devices, and the like for four colors of Y (yellow), M (magenta), C (cyan), and K (black) while their detailed explanations are omitted here. Image forming stations for the four colors are provided to the image forming part 12, each of which includes a photoconductor drum, a charger, a developing device, an intermediate transfer belt, a transfer roller, and a cleaning device. Examples of the image forming apparatus 10 include a tandem type image forming apparatus having its image forming stations for the four colors arranged in a line in the horizontal direction in the image forming part 12.

The image reader 14 includes a housing 24 including a document placement table formed of a transparent material on its upper surface. A light source, a plurality of mirrors, an imaging lens, a line sensor, and the like are provided in the housing 24. The image reader 14 exposes a document surface with a light source, guides the reflected light reflected from the document surface to the imaging lens with the use of the plurality of mirrors, and forms an image of the reflected light on a light receiving element of the line sensor with the use of the imaging lens. The line sensor detects the brightness and chromaticity of the reflected light imaged on the light receiving element, and thus image data based on the image on the document surface is generated. The line sensor can be a charge coupled device (CCD), a contact image sensor (CIS), or the like.

The in-body sheet discharger 16 has its bottom and top surfaces partitioned by the housing of the image forming part 12 and the housing 24 of the image reader 14 while having its right side surface and back surface partitioned by the first connection housing 12a and the second connection housing 12b. That is, the in-body sheet discharger 16 is open at the front surface side and the left side surface. The in-body sheet discharger 16 includes a paper discharge tray 26 that receives image-formed sheets discharged from the discharge port.

A document presser cover 30 is attached in an openable/closable manner to the upper surface of the image reader 14 via a hinge or the like disposed on the rear side. The document presser cover 30 includes an automatic document feeder (ADF) 34 that automatically feeds sheets one by one that are placed on a document placement tray 32 to an image reading position of the image reader 14.

Further in the first embodiment, the housing 24 of the image reader 14 includes a housing projecting part 24a that projects forward of the front surface of the document presser cover 30. That is, the front end portion of the housing 24 projects forward of the front surface of the document presser cover 30. An operation unit 18 is provided on the front surface side of the housing 24 of the image reader 14. The specific configurations of the operation unit 18 and the housing projecting part 24a will be described later.

Not shown in the drawings, a controller that controls the operation of each part of the image forming apparatus 10 is provided at a predetermined position of the image forming apparatus 10. The controller includes a central processing unit (CPU), a memory, and the like, transmits control signals to each part of the image forming apparatus 10 in response to an input operation into the operation unit 18 by a user and the like, and effects a variety of operations of the image forming apparatus 10.

In addition, the image forming apparatus 10 may include a mounting portion (e.g., a drive and a memory slot) for mounting a variety of recording media. Examples of the variety of recording media include an optical disk (e.g., a compact disc-recordable (CD-R), a digital versatile disc-recordable (DVD-R), and a blu-ray disc-recordable (BD-R)) and a flash memory (e.g., a universal serial bus (USB) memory, an secure digital (SD) memory card, and a memory stick). Note that an optical disk is mounted on the drive while a flash memory is mounted on the memory slot.

Next, the specific configurations of the operation unit 18 and the front end portion (the housing projecting part 24a) of the housing 24 of the image reader 14 to which the operation unit 18 is attached will be described.

Figure 2:
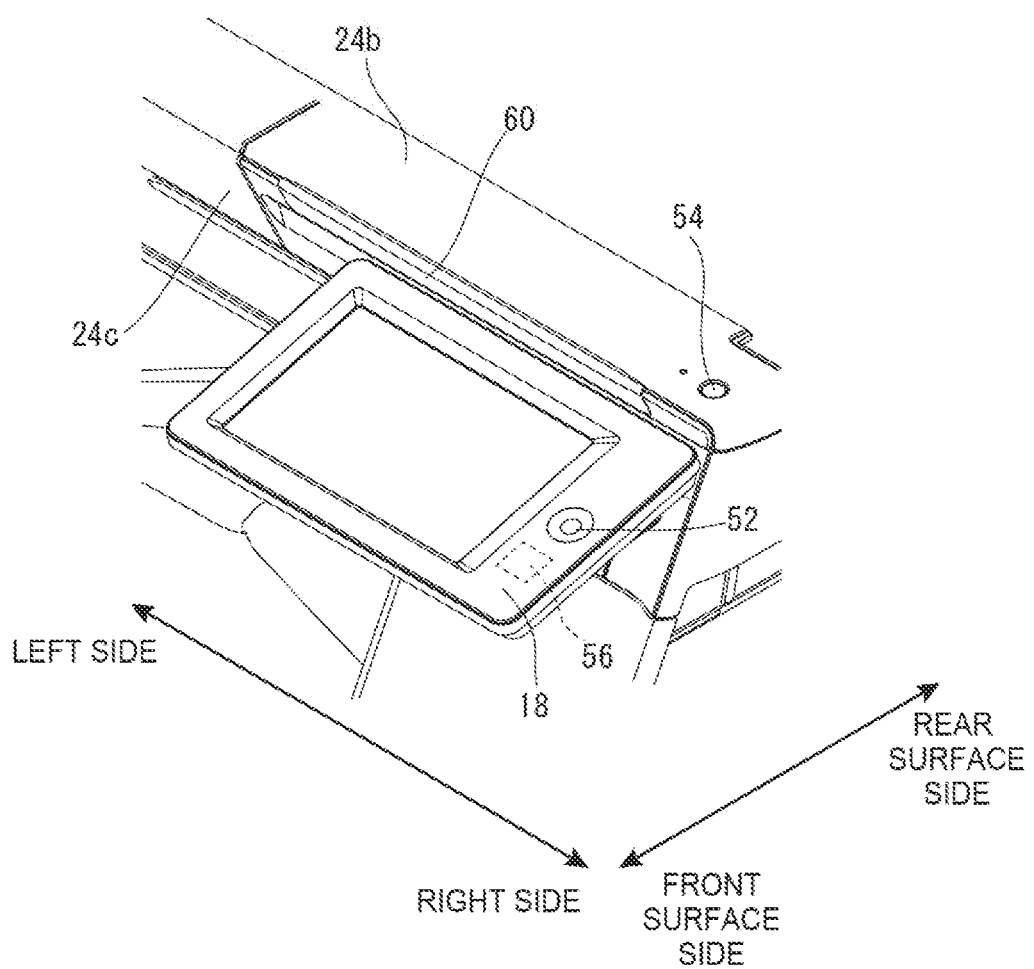
FIG. 2 is a perspective view showing a peripheral portion of a status display part as viewed from the front obliquely upper side.
Figure 3:
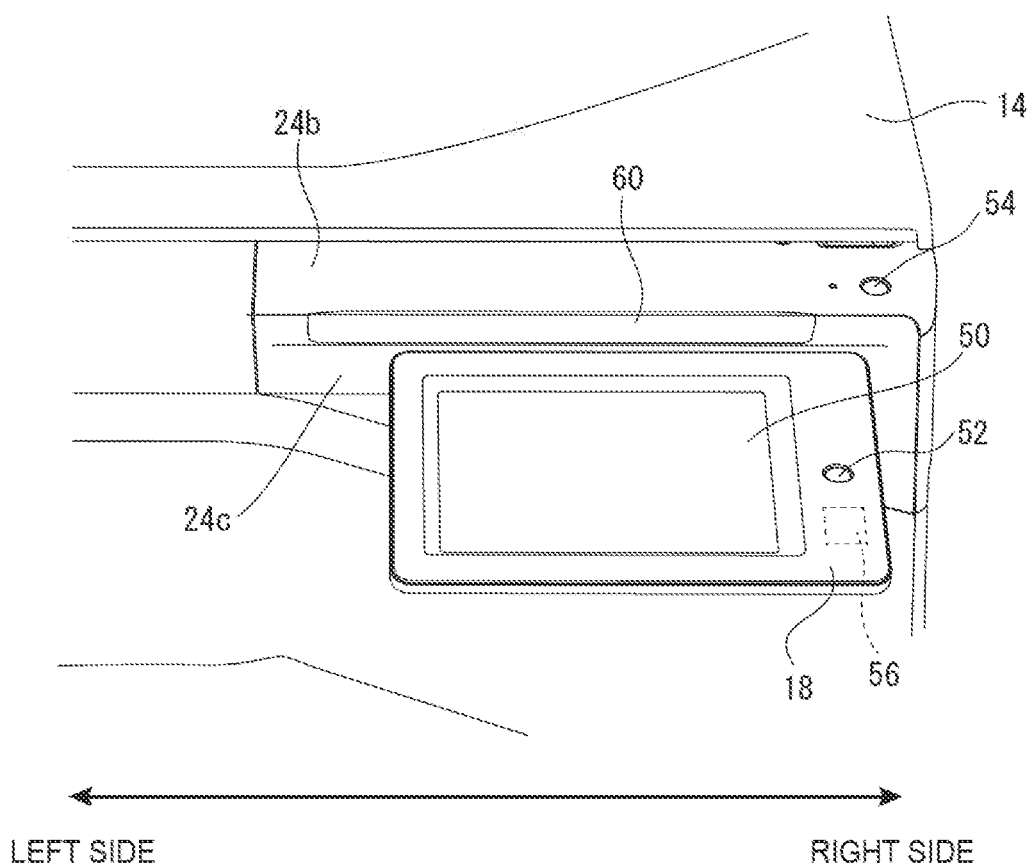
FIG. 3 is a perspective view showing a peripheral portion of the status display part as viewed from the front upper side.

As shown in FIGS. 1 to 3, the operation unit 18 is of a horizontally-long substantially rectangular plate shape. The lateral width (the length in the right-left direction) of the operation unit 18 is set to be, for example, about half the lateral width of the housing 24 of the image reader 14. The operation unit 18 is disposed on the right side of the front surface of the housing 24. Note that the size of the operation unit 18 can be appropriately varied depending on the size or the like of a touch panel display 50 to be mounted thereon, and is not particularly limited. In addition, the operation unit 18 is provided slightly inclined downward toward the front so that a user can easily see its upper surface. The touch panel display 50 and a home key 52 are provided on the upper surface of the operation unit 18.

The touch panel display 50 has a built-in short-range communication part 56. This short-range communication part 56 is, for example, an near field communication (NFC) reader/writer, includes a controller, a storage unit, and an antenna, and can transmit and receive data in accordance with communication standards such as a communication standard of international organization for standardization/ international electrotechnical commission (ISO/IEC) 18092 (so-called NFC). The short-range communication part 56 transmits and receives communication data via short-range radio communication with an external terminal such as an integrated circuit (IC) card, a smart phone, or a feature phone.

The touch panel display 50 is a touch panel integrated liquid crystal display device having a configuration that an analog resistive film and the like are laminated on a liquid crystal display panel, and is provided in the area excluding the area on the peripheral edge and the right side of the upper surface of the operation unit 18. In the first embodiment, a capacitance method is used as a detection method for detecting touch positions on the touch panel display 50. Other known methods such as an infrared blocking detection method, a surface acoustic wave method, and a resistive film method can be appropriately used. The touch panel display 50 displays software keys, messages, and the like for receiving a variety of settings and printing instructions from users. As an example, a home screen for selecting a desired operating mode from a variety of operation modes that the image forming apparatus 10 can execute is displayed on the touch panel display 50.

The home key 52 is a capacitance type hardware key that detects user's operations based on a change in capacitance, and is provided in the area on the right side of the touch panel display 50. The home key 52 is for carrying out a shift instruction to the home screen, and when the home key 52 is pressed by a user, the home screen is displayed on the touch panel display 50.

It is to be noted that the software keys refer to keys that are reproduced on the screen in terms of software. On the other hand, the hardware keys refer to keys (buttons) that are provided as physical devices.

In addition, the operation unit 18 has its inclination angle variable with respect to the image reader 14. The operation unit 18 is basically disposed at a basic position in the state of being slightly inclined downward toward the front (e.g., inclined at an inclination of 10 degrees with respect to the horizontal direction); however, when a user with a low line of sight, such as a wheelchair user, uses the image forming apparatus 10, the inclination angle of the operation unit 18 is appropriately varied so that the upper surface of the operation unit 18 turns more to the front surface side in accordance with the user's line of sight. In the first embodiment, the operation unit 18 is rotationally moved around a shaft 44 (see FIG. 5) extending in the right-left direction manually by a user from the basic position shown in the drawings to a position substantially parallel to the front surface of the first connection housing 12a.

Meanwhile, the housing projecting part 24a, which is a front end portion of the housing 24 of the image reader 14, has an upper surface 24b that is a surface parallel to the document placement table, that is, a horizontal surface. A step is formed between the upper surface 24b of the housing projecting part 24a and the upper surface of the operation unit 18, and thus the upper surface of the operation unit 18 is disposed at a position lower than the upper surface 24b of the housing projecting part 24a.

In addition, the front surface 24c of the housing projecting part 24a (i.e., the front surface of the housing 24) defines a downward inclined surface that gets in more rearward as it goes downward. Further, the front surface 24c of the housing projecting part 24a is provided with a recessed portion extending in the lateral direction. The rear end of the upper surface of the operation unit 18 is disposed behind the upper end of the inclined surface formed on the front surface 24c of the housing projecting part 24a, and the rear end portion of the operation unit 18 gets in under the inclined surface of the housing projecting part 24a. Further, the rear end of the upper surface of the operation unit 18 is disposed behind the upper end of the recessed portion formed on the front surface 24c of the housing projecting part 24a, and the rear end of the operation unit 18 gets in under the recessed portion of the housing projecting part 24a (or gets in the inside of the recessed part).

In the first embodiment, a power key 54 is provided on the upper surface 24b of the housing projecting part 24a. The power key 54 is a mechanical hardware key that detects user's operations based on switching of a mechanical contact state as well as being an operation key for turning on/off the power of the image forming apparatus 10. The power key 54 is disposed behind the touch panel display 50 within the lateral width range of the operation unit 18. More specifically, the power key 54 is provided at a right end portion of the upper surface 24b of the housing projecting part 24a, and the power key 54 and the home key 52, which is a hardware key provided to the operation unit 18, are aligned in the front-rear direction.

In addition, a status display part 60 is provided on the front surface 24c of the housing projecting part 24a. Hereinafter, the configurations of the status display part 60 and a peripheral portion thereof will be described with reference to FIGS. 2 to 6 and the like. The image reader 14 is omitted for simplicity in FIGS. 2 to 6.

As shown in FIGS. 2 to 6, the status display part 60 is of a horizontally-long shape extending in the right-left direction, and is disposed behind the touch panel display 50 within the range including the lateral width of the operation unit 18. That is, the status display part 60 is provided to face the operation unit 18 (the touch panel display 50). This can be said that the status display part 60 is disposed immediately behind the operation unit 18. In addition, the status display part 60 is disposed above the recessed portion of the housing projecting part 24a.

Figure 4A:
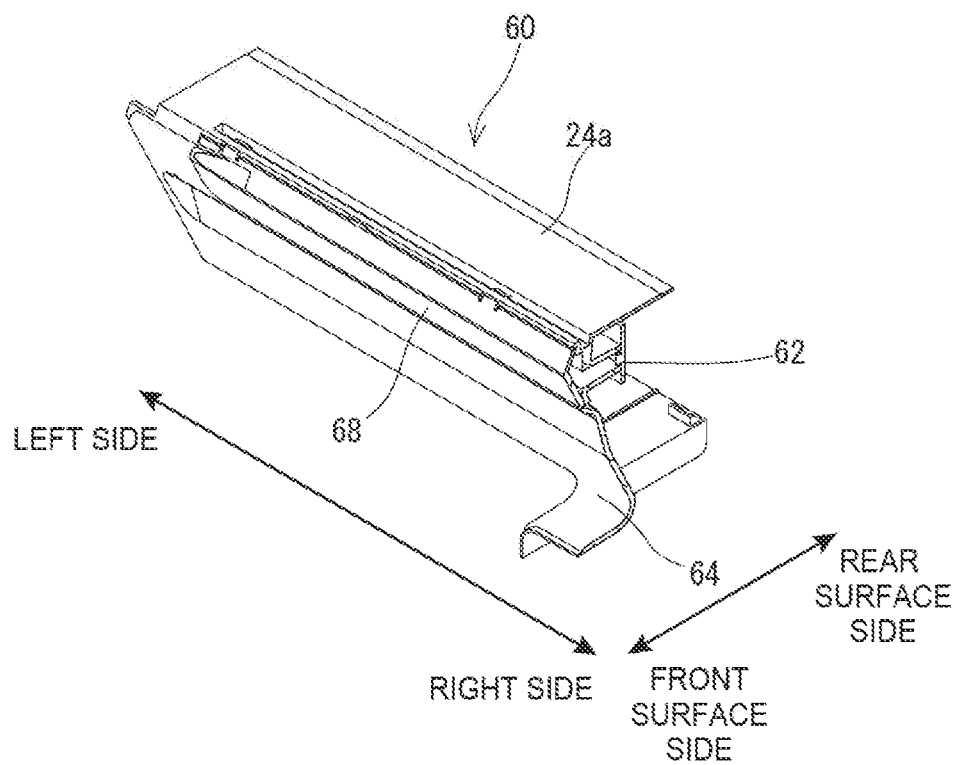
FIG. 4A is a schematic cross-sectional view of a peripheral portion of the status display part.
Figure 4B:
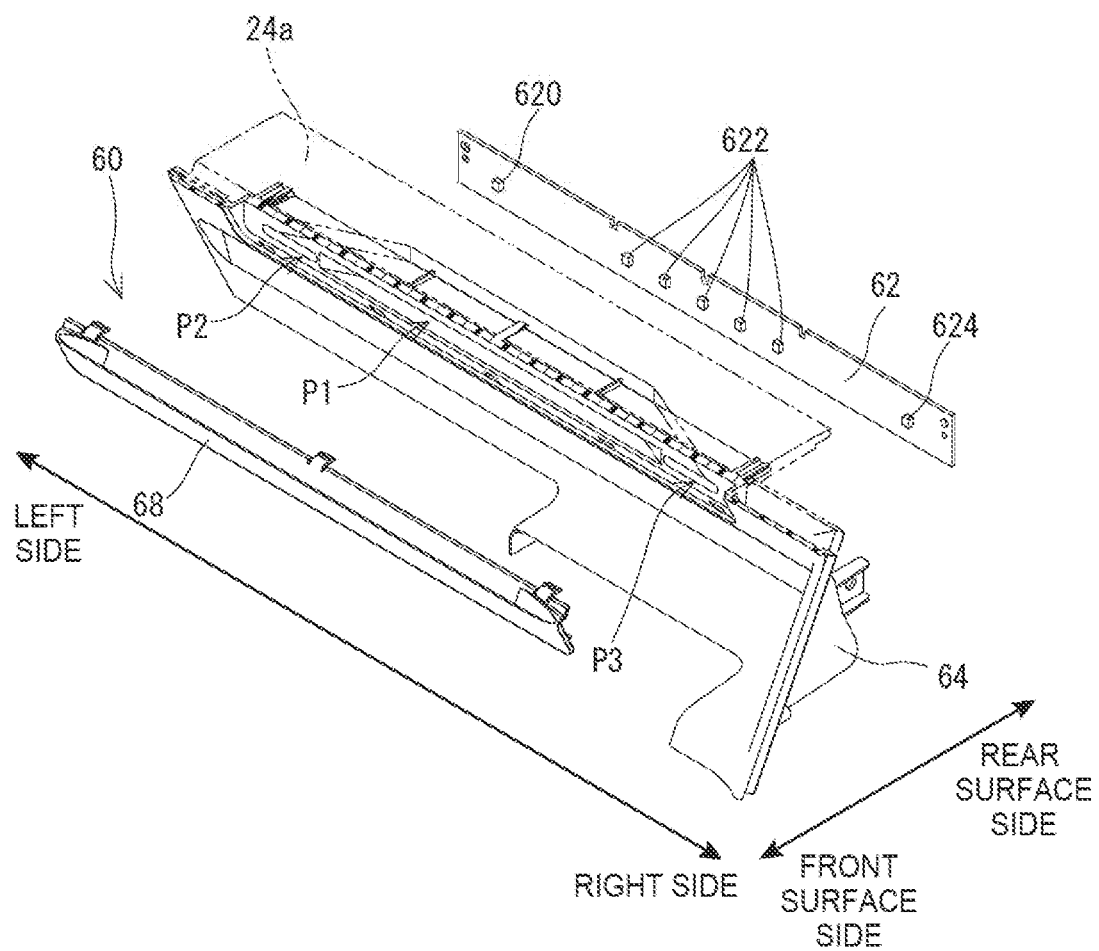
FIG. 4B is an exploded view showing the status display part.
Figure 5:
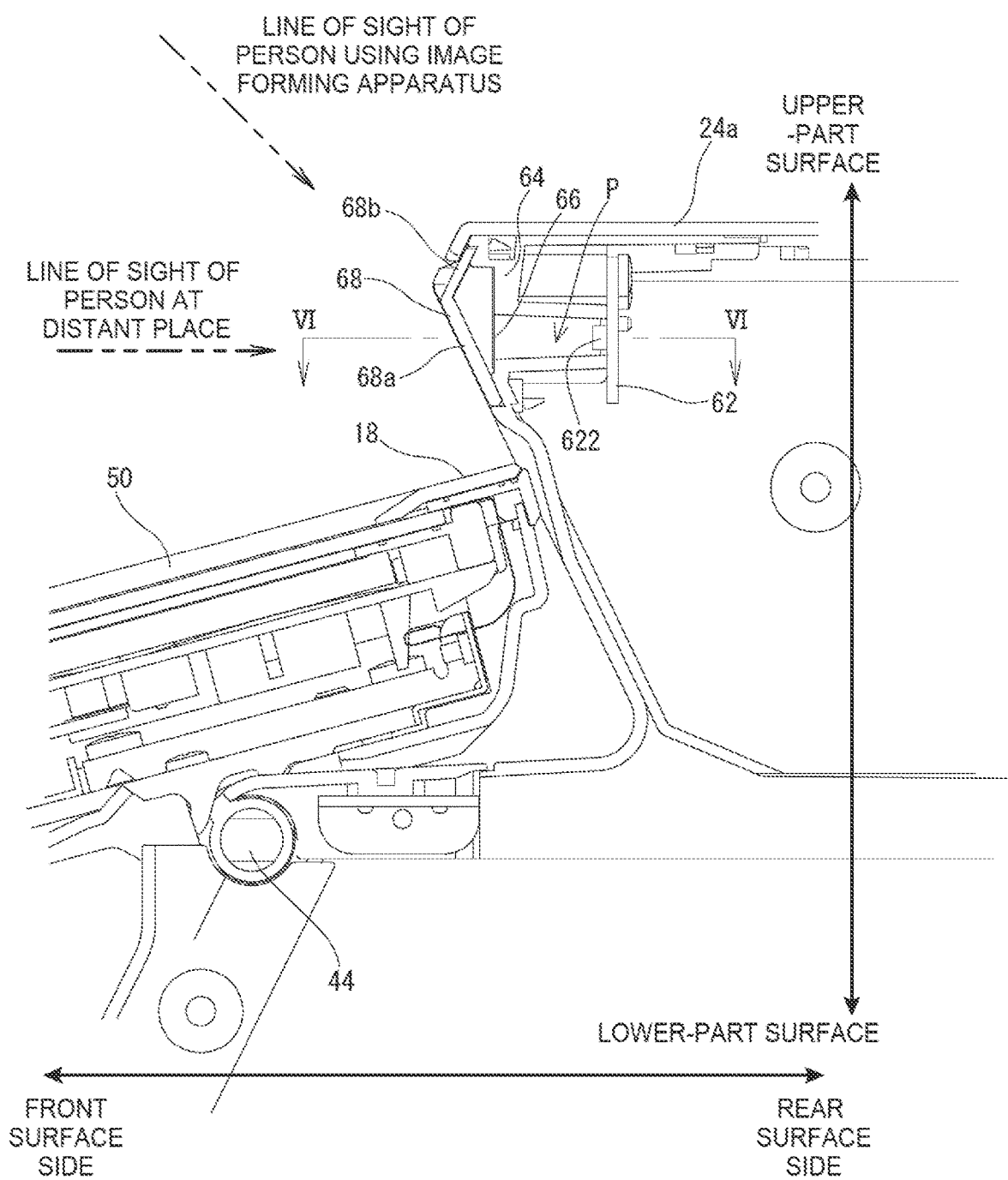
FIG. 5 is a schematic cross-sectional view of a peripheral portion of the status display part as viewed from the side.
Figure 6:
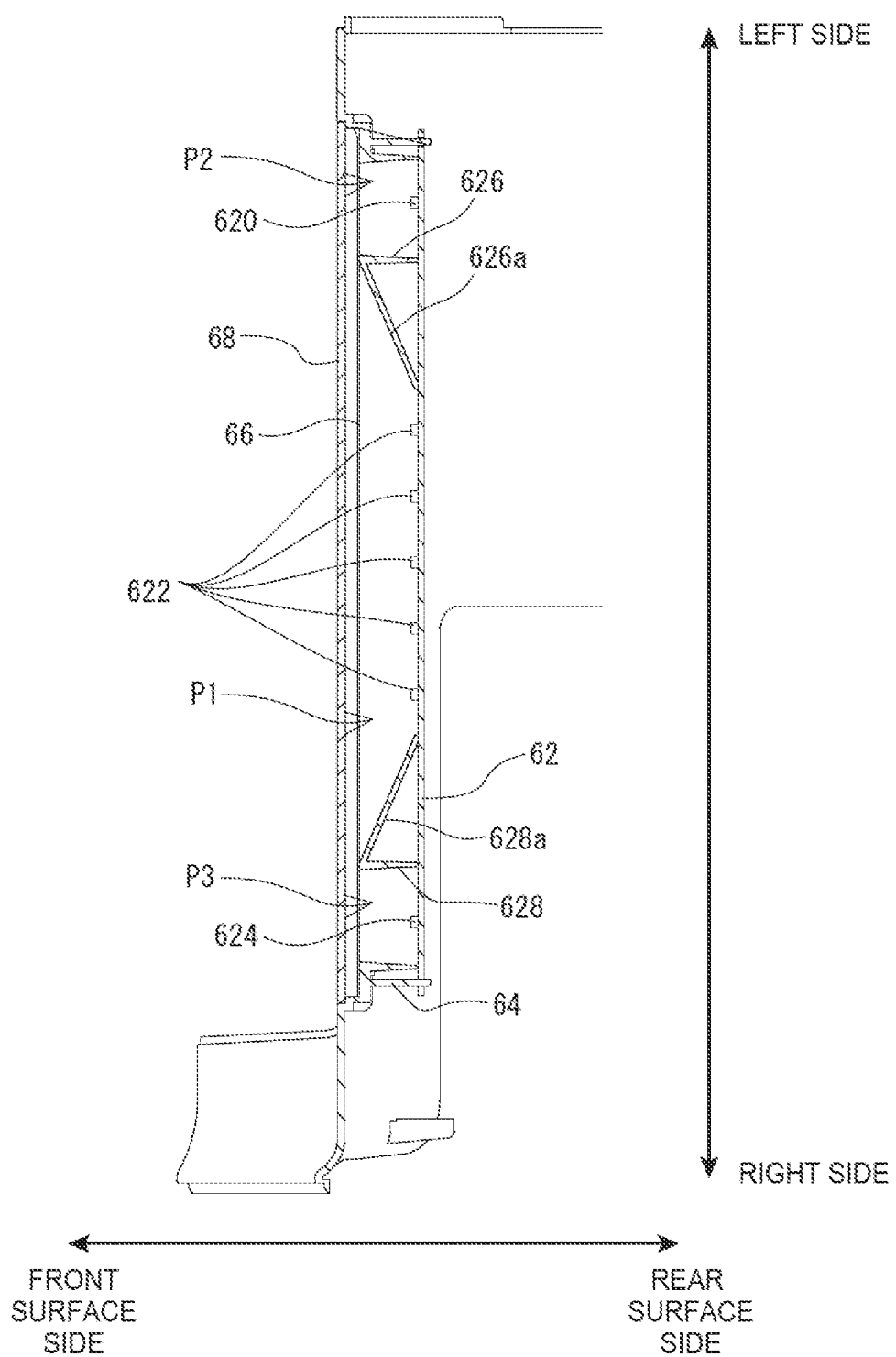
FIG. 6 is a schematic cross-sectional view of a peripheral portion of the status display part as viewed from the above.

As shown in FIGS. 4 to 6, the status display part 60 includes a board 62, a light guide path forming member 64, a light diffusing member 66, and a filter 68. The light diffusing member 66 constitutes a light emitter, or the light diffusing member 66 and the filter 68 constitute the light emitter.

The board 62 is a plate member of a substantially rectangular shape long in the right-left direction. Light emitting diodes (LEDs) 620, 622, and 624 that are light sources of the status display part 60 are provided on a surface on the front surface side of the board 62. That is, The LEDs 620, 622, and 624 are supported by the image forming apparatus 10 through the board 62.

The LEDs 620, 622, and 624 may be LEDs of a single light emission color, or LEDs of changeable light emission colors. The LED 620 is disposed at a left end portion of the board 62, and the LED 622 is disposed at the approximate center in the right-left direction of the board 62. The LED 624 is disposed at a right end portion of the board 62. Note that the LED 622 includes a plurality of LEDs. In the first embodiment, five LEDs 622 are provided. The five LEDs 622 are disposed side by side in the lateral direction at predetermined intervals.

The light guide path forming member 64 constitutes a part of the housing projecting part 24a, and is a member that forms a light guide path P for guiding light from the LEDs 620, 622, and 624 to the outside of the image forming apparatus 10. More specifically, the light guide path P is provided between the LEDs 620, 622, and 624 and the light diffusing member 66. Note that the light guide path P extends in the front-rear direction, and defines space of a horizontally-long substantially cylindrical shape that is large in size in the right-left direction (width) and small in size in the up-down direction (height) when viewed from the front surface side.

In addition, the light guide path forming member 64 includes boundary walls 626 and 628 extending in the up-down direction and the front-rear direction to partition the light guide path P in the right-left direction. Note that the boundary wall 626 is provided between the LED 620 and the LEDs 622 while the boundary wall 628 is provided between LEDs 622 and LED 624.

Thus, the light guide path P is partitioned into the space between the boundary wall 626 and the boundary wall 628 (a first light guide path P1), the space on the left side of the boundary wall 626 (a second light guide path P2), and the space on the right side of the boundary wall 628 (a third light guide path P3) by the boundary walls 626 and 628.

Each of the first light guide path P1, the second light guide path P2, and the third light guide path P3 is of a horizontally-long substantially cylindrical shape when viewed from the front surface side. The first light guide path P1 is for guiding the light from the five LEDs 622 to the light diffusing member 66, the second light guide path P2 is for guiding the light from the LED 620 to the light diffusing member 66, and the third light guide path P3 is for guiding the light from the LED 624 to the light diffusing member 66.

It is to be noted that the boundary wall 626 includes an inclined surface 626a that are inclined rightward gradually from the front surface side to the rear surface side, and the boundary wall 628 includes an inclined surface 628a that are inclined leftward gradually from the front surface side to the rear surface side as shown in FIG. 6. The left side surface of the first light guide path P1 is partitioned by the inclined surface 626a, and the right side surface of the first light guide path P1 is partitioned by the inclined surface 628a. Thus, the first light guide path P1 has a configuration of continuously becoming larger in width (lateral width) in the right-left direction gradually from the rear surface side (the LEDs 622 side, that is, the light source side) to the front surface side (the filter 68 side or the light diffusing member 66 side).

The light diffusing member 66 is of a plate shape and provided so as to cover the openings on the front surface sides of the first light guide path P1, the second light guide path P2, and the third light guide path P3. The light diffusing member 66 is disposed closer to the filter 68 than to a midpoint between the LEDs 620, 622, and 624 and the filter 68 in the front-rear direction (depth direction). To be specific, the light diffusing member 66 is disposed closer to the filter 68 than to a midpoint in the light guide path P from the LEDs 620, 622, and 624 to the filter 68.

The light diffusing member 66 may be, for example, a light diffusing sheet. When light from the LEDs 620, 622, and 624 enters the light diffusing member 66, the portion where the light enters, and its peripheral portions become luminous. That is, when light from 620, 622, and 624 enters the light diffusing member 66, the light diffusing member 66 functions as a planar luminous body. The light diffusing sheet is a resin sheet with a thickness of 0.5 mm, and examples of the light diffusing sheet include a light diffusing sheet having its surface subjected to unevenness treatment, a light diffusing sheet that contains light diffusing fine particles inside the sheet, and the like.

The filter 68 is formed of a light transmitting material capable of transmitting light, and transmits the light from the light diffusing member 66, that is, the light from the LEDs 620, 622, and 624 to emit the light to the outside of the status display part 60. The filter 68 is preferably a smoke-color filter colored in black, gray, or the like so that the shapes of the LEDs 620, 622, and 624 cannot be directly recognized from the outside.

In addition, the filter 68 includes a first surface 68a and a second surface 68b. The first surface 68a and the second surface 68b are formed to have different angles in the up-down direction. That is, the first surface 68a and the second surface 68b are formed to emit the light from the light diffusing member 66 in different visible directions in the up-down direction.

Specifically, the first surface 68a is inclined more rearward as it goes downward while the second surface 68b is inclined more rearward as it goes upward. That is, in the surface on the front surface side of the filter 68, the lower-part surface that faces obliquely downward defines the first surface 68a while the upper-part surface that faces obliquely upward defines the second surface 68b. In the first embodiment, the second surface 68b is provided above the first surface 68a, and an upper end portion of the first surface 68a is connected with a lower end portion of the second surface 68b. That is, the filter 68 has a substantially V-shaped cross section opened to the rear surface side (rearward) when viewed from the right-left direction. The area of the first surface 68a is larger than that of the second surface 68b. Further, the front projection area of the first surface 68a is larger than that of the second surface 68b. Note that the front projection area refers to an area viewed from the front.

Further, the central portion in the right-left direction of the second surface 68b is formed to be recessed with respect to both end portions in the right-left direction of the second surface 68b as shown in FIG. 2, FIG. 3, and FIG. 4B. As a result of this, the flat portion of the second surface 68b can be increased in width in the up-down direction or the front-rear direction. That is, the plane portion of the second surface 68b can be increased in size at the center in the right-left direction.

Next, operation examples of the status display part 60 of the first embodiment will be described. First, when the LEDs 622 are turned on, all of the five LEDs 622 may be turned on simultaneously, or some of the five LEDs 622 may be turned on. When some of the plurality of LEDs 622 are turned on, they may be simply turned on, they may be turned on sequentially from the right or the left, they may be turned on sequentially from both the ends toward the center, or they may be turned on sequentially from the center toward both the ends. Since the plurality of LEDs 622 are provided, they can be turned on in a variety of light emission expression manners.

For example, when some of the five LEDs 622 are turned on, the light diffusing member 66 becomes luminous at portions in front of the turned-on LEDs 622 and at its peripheral portions. When all of the five LEDs 622 are turned on, the light diffusing member 66 becomes luminous at portions in front of the five LEDs 622, that is, at a portion in front of the first light guide path P1, and at its peripheral portions. To be specific, when the LEDs 622 are turned on, the light diffusing member 66 becomes luminous at its central portion. Since the light from the light diffusing member 66 is transmitted through the filter 68 and emitted to the outside as described above, the status display part 60 appears to be, when the LEDs 622 are turned on, luminous at its central portion when seen from the outside (the front surface side) of the image forming apparatus 10.

When the LED 620 is turned on, the light diffusing member 66 becomes luminous in front of the LED 620, that is, at a portion in front of the second light guide path P2 and at its peripheral portions. To be specific, when the LED 620 is turned on, the light diffusing member 66 becomes luminous at its left end portion. Thus, the status display part 60 appears to be, when the LED 620 is turned on, luminous at its left end portion when seen from the outside of the image forming apparatus 10.

When the LED 624 is turned on, the light diffusing member 66 becomes luminous in front of the LED 624, that is, at a portion in front of the third light guide path P3 and at its peripheral portions. To be specific, when the LED 624 is turned on, the light diffusing member 66 becomes luminous at its right end portion. Thus, the status display part 60 appears to be, when the LED 624 is turned on, luminous at its right end portion when seen from the outside of the image forming apparatus 10.

It is to be noted that the LEDs 620, 622, and 624 are switched between turning-on and turning-off according to control signals transmitted from the controller. The controller controls the LEDs 620, 622, and 624 to be turned on/off according to the operating status of the image forming apparatus 10.

For example, the LED 620 is turned on when facsimile data is received, when image data sent from an external computer is received, or the like in the image forming apparatus 10, and then until a predetermined set time (e.g., two minutes) elapses after the completion of the data reception, the LED 620 is kept turned on or blinking.

The LED 624 is turned on or blinks when predetermined errors occur, for example, when paper in the paper cassette 20 runs out (i.e., out of paper), and when paper is accumulated (i.e., paper jam or jam) in the image forming part 12. When the error is fixed by having the paper cassette 20 replenished (resupplied) with paper or by having the accumulated paper removed, the LED 624 is turned off.

The LED 622 is turned on or blinks according to the status of the image forming apparatus 10 or according to user's operations conducted on the image forming apparatus 10.

Note that the LED 620 or the LED 624 is turned on or blinks for reasons other than the above-described reasons for being turned on or blinking. Examples of the user's operations conducted on the image forming apparatus 10 include touch operations conducted on the software keys displayed on the touch panel display 50, operations of pressing hardware keys such as the home key 52 and the power key 54, and operations of holding an external terminal, which defines a communication target, over the short-range communication part 56.

Examples of the case where the LED 622 is turned on according to user's operations conducted on the image forming apparatus 10 include cases where predetermined user's operations are conducted on the operation unit 18 such as a case where the power of the image forming apparatus 10 is turned on/off, a case where a recording medium is mounted on the mounting portion for mounting a recording medium, and a case where short-range radio communication is performed with an external terminal by the short-range communication part 56. Examples of the case where the LED 622 is turned on according to the status of the image forming apparatus 10 include a case where image quality adjustment processing is being performed, and a case where toner replenishment is being performed.

It is to be noted that the case where the power of the image forming apparatus 10 is turned on/off is a case where the power key 54 is operated by a user. The case where a recording medium is mounted on the mounting portion is a case where a USB memory is mounted on the USB memory slot. The case where a short-range radio communication is performed is a case where an IC card, a mobile terminal, or the like is held over (brought into contact with) the short-range communication part 56. The case where predetermined user's operations are conducted is a case where keys (e.g., a copy key) for making a choice among a copy function, a fax function, a scanner function, and the like displayed on the home screen are operated. The image quality adjustment processing is a processing of transferring a toner image on the photosensitive drum and the intermediate transfer belt of the image forming part 12, and adjusting a developing bias according to the density of the toner image. Performing toner replenishment is replenishing the developing devices with toner from toner cartridges when toner runs out and a serviceman or a person in charge replaces the toner cartridges with new toner cartridges.

FIG. 8 is an illustrative view showing light emission patterns of the status display part 60. Note that FIG. 8 schematically shows portions corresponding to the five LEDs 622 in the status display part 60. As described above, since the five LEDs 622 are provided, a plurality of light emission patterns can be expressed by shifting the turning on/off timing of the five LEDs 622 as shown in FIG. 8. For example, in the light emission pattern 1, after the five LEDs 622 are turned on randomly, they are turned on simultaneously and then turned off simultaneously. In the light emission pattern 2, the five LEDs 622 are turned on simultaneously and are turned off randomly; however, in the light emission pattern 2, the luminous amounts (brightness) of the LEDs 622 are adjusted (set) so that the LED 622 at the center is the brightest and the LEDs 622 at both the ends are the darkest when the five LEDs 622 are turned on. In the light emission pattern 3, the LED 622 at the center is turned on first, and after a predetermined time, the LED 622 at the center is turned off while the LEDs 622 next to the LED 622 at the center are turned on. Further after a predetermined time, the LEDs 622 next to the LED 622 at the center are turned off while the LEDs 622 at both the ends are turned on, and then all of the LEDs 622 are turned off, which is not shown in the drawings. To be specific, in the example shown in the light emission pattern 3, light appears to travel from the center to the outside in the right-left direction. In the light emission pattern 4, all of the five LEDs 622 are turned on simultaneously, and then all of the five LEDs 622 are slowly turned off at the same timing. In the light emission pattern 5, the LED 622 at the left end is turned on first, and after a predetermined time, the LED 622 at the left end is turned off while the LED 622 on its right side is turn on. This is repeated until the LED 622 at the right end is turned on, and after a predetermined time has elapsed since the LED 622 at the right end was turned on, all of the LEDs 622 are turned off. To be specific, in the example shown in the light emission pattern 5, light appears to travel from the left end to the right end. Note that the light emission patterns 1 to 5 are merely examples, and other modified light emission patterns may be adopted.

Since the plurality of light emission patterns can be expressed in the status display part 60 in this manner, the light emission patterns may be varied when the LEDs 622 are turned on according to the user's operations conducted on the image forming apparatus 10 or the status of the image forming apparatus 10, that is, the reasons that the LEDs 622 are turned on.

It is to be noted that LEDs 620, 622, and 624 preferably have different light emission colors because they have different purposes. For example, the light emission color of the LED 620 is green, the light emission color of the LED 622s is blue, and the light emission color of the LED 624 is red.

In addition, a user is mostly considered to be at a place distant from the image forming apparatus 10 in the status where the LED 620 or the LED 624 is turned on and the status where the LEDs 622 are turned on according to the status of the image forming apparatus 10 (in a case where image quality adjustment processing is being performed and a case where toner replenishment is being performed). In this case, a user can visually recognize easily that the LED 620 or the LED 624 is turned on by seeing the light emitted from the first surface 68a.

Further, a user is considered to be in front of the touch panel display 50 in the status where the LEDs 622 are turned on according to the user's operation conducted on the image forming apparatus 10. In this case, a user can easily recognize that the LEDs 622 are turned on by seeing the light emitted from the second surface 68b.

According to the first embodiment, since the filter 68 of the status display part 60 includes the first surface 68a and the second surface 68b formed to emit light from the light diffusing member 66 in different visible directions in the up-down direction, it is possible to recognize that the status display part 60 is turned on by seeing the status display part 60 from either of the first surface 68a and the second surface 68b. Thus, the visibility of the status display part 60 for notifying a user of the status of the apparatus can be improved.

In addition, according to the first embodiment, since the status display part 60 is provided to face the operation unit 18 (the touch panel display 50), the status display part 60 is positioned on the front side in the direction of sight line of a person operating the image forming apparatus, which allows the status display part 60 to more easily enter into the effective field of view of the person operating the image forming apparatus. As a result, the person operating the image forming apparatus can more easily recognize, when operating the operation unit 18, that the status display part 60 is turned on.

Further, according to the first embodiment, since the light diffusing member 66 is provided between the LEDs 620, 622, and 624 and the filter 68, the light emission range can be enlarged without significantly reducing the luminance, which allows the visibility of the status display part 60 to be improved.

Further, according to the first embodiment, since the light diffusing member 66 is disposed closer to the filter 68 than to the midpoint between the LEDs 620, 622, and 624 and the filter 68, the luminance of luminous portions in the light diffusing member 66 can be increased, which allows the visibility of the status display part 60 to be improved.

Further, according to the first embodiment, since the first light guide path P1 has a configuration of continuously becoming larger in width in the right-left direction gradually from the light source side to the front surface side, the light emission range can be enlarged when the LEDs 622 are turned on, which allows the visibility of the status display part 60 to be improved.

Further, according to the first embodiment, since the first surface 68a is formed to be inclined more rearward as it goes downward and to face obliquely downward, the first surface 68a can emit light in the direction of sight line of a person at a place distant from the image forming apparatus 10 (in the substantially horizontal direction). Thus, a person at a place distant from the image forming apparatus 10 can easily recognize that the status display part 60 is turned on by seeing the first surface 68a.

Further, according to the first embodiment, since the second surface 68b is formed to be inclined more rearward as it goes upward and to face obliquely upward, the second surface 68b can emit light in the direction of sight line of a person operating the image forming apparatus 10 (in the up-to-down direction). Thus, a person operating the image forming apparatus 10 can easily recognize that the status display part 60 is turned on by seeing the second surface 68b.

Further, according to the first embodiment, since the area of the first surface 68a is larger than that of the second surface 68b, and the front projection area of the first surface 68a is larger than that of the second surface 68b, the visibility of the status display part 60 by a person at a place distant from the image forming apparatus 10 can be further improved.

Second Embodiment

The image forming apparatus 10 according to the second embodiment is the same as the first embodiment except that the configuration of the status display part 60 is partially changed, so that a duplicate description is omitted.

Figure 7:
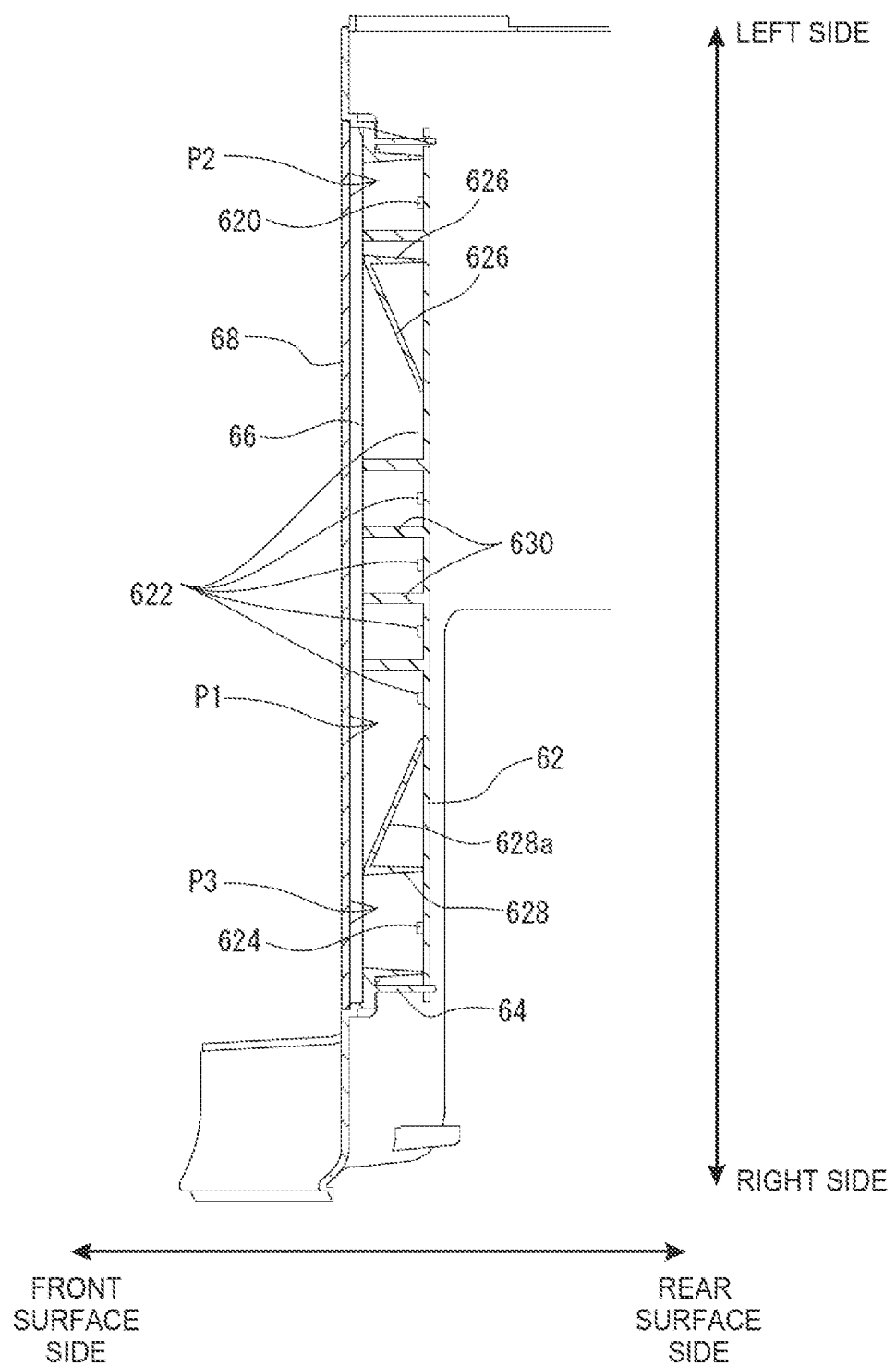
FIG. 7 is a schematic cross-sectional view of a peripheral portion of a status display part in the second embodiment as viewed from above.

FIG. 7 is a schematic cross-sectional view of a peripheral portion of the status display part 60 in the second embodiment as viewed from above. In the second embodiment, the light guide path forming member 64 includes a plurality of boundary walls 630 extending in the up-down direction and the front-rear direction to partition the light guide path P in the right-left direction as shown in FIG. 7.

Note that each of the boundary walls 630 is provided between two of the plurality of LEDs 622. That is, four boundary walls 630 are provided among the five LEDs 622 in the second embodiment.

Thus, the first light guide path P1 is partitioned into five spaces each corresponding to the five LEDs 622 by the plurality of boundary walls 630. That is, light guide paths each corresponding to the five LEDs 622 are formed.

According to the second embodiment, it is possible to improve the visibility of the status display part 60 for notifying a user of the status of the apparatus in the same manner as the first embodiment.

Note that the specific shapes and the like given in the above-described embodiments are examples, and can be appropriately changed according to the actual product.

In the embodiments described above, while the central portion in the right-left direction of the second surface 68*b* is recessed with respect to both the end portions in the right-left direction of the second surface 68*b* in order to increase the plane portion in size at the center in the right-left direction of the second surface 68*b*, the present invention is not necessarily limited to this configuration. For example, it is also possible for the central portion in the right-left direction of the second surface 68*b* to have a configuration of projecting with respect to both the end portions in the right-left direction of the second surface 68*b*.

Further, while the second surface 68*b* is provided above the first surface 68*a* in the above-described embodiments, the present invention is not necessarily limited to this configuration. For example, the second surface 68*b* may be provided under the first surface 68*a*. In this case, the lower end portion of the first surface 68*a* is connected with the upper end portion of the second surface 68*b*. That is, the filter 68 has a substantially V-shaped cross section opened to the front surface side (forward) when viewed from the right-left direction.

10 . . . Image forming apparatus
12 . . . Image forming part
14 . . . Image reader
18 . . . Operation unit
24 . . . Housing of image reader
24*a* . . . Housing projecting part
24*b* . . . Upper surface of housing projecting part
24*c* . . . Front surface of housing projecting part
30 . . . Document presser cover
50 . . . Touch panel display
52 . . . Home key
54 . . . Power key
60 . . . Status display part
620, 622, 624 . . . Light emitting diode (LED)
64 . . . Light guide path forming member
66 . . . Light diffusing member
68 . . . Filter
P . . . Light guide path

What is claimed is:

1. An image forming apparatus including an operation unit provided on a front surface side of the image forming apparatus and including at least a touch panel display, the apparatus comprising
    a status display part provided on a rear side of the touch panel display,
    wherein the status display part includes a light source and a light emitter that emits light from the light source to the outside, and
    wherein the light emitter includes a first surface and a second surface that emit light from the light source in different visible directions in an up-down direction;
    wherein the light emitter includes a light diffusing member that diffuses the light from the light source, and a filter that transmits the light from the light diffusing member and emits the light to the outside, and
    wherein the light diffusing member is disposed closer to the filter than to a midpoint between the light source and the filter in a light guide path from the light source to the filter, and
    comprising a light guide path forming member that forms the light guide path,
    wherein the light guide path forming member has a shape where the light guide path becomes larger in lateral width as the light guide path gets closer to the light diffusing member from the light source.

2. The image forming apparatus according to claim 1, further comprising an image reader,
    wherein the status display part is provided on a front surface side of a housing of the image reader.

3. The image forming apparatus according to claim 1,
    wherein the status display part is provided to face the touch panel display.

4. The image forming apparatus according to claim 1,
    wherein the first surface is inclined more rearward as it goes downward, and
    wherein the second surface is inclined more rearward as it goes upward.

5. The image forming apparatus according to claim 4,
    wherein the first surface has an area larger than the second surface.

* * * * *